United States Patent
Albertsson et al.

(10) Patent No.: US 7,991,417 B2
(45) Date of Patent: Aug. 2, 2011

(54) METHODS AND APPARATUS FOR PUSH TO TALK TYPE SERVICE

(75) Inventors: Henrik Albertsson, Stockholm (SE); Jan Holm, Örbyhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 603 days.

(21) Appl. No.: 12/091,366

(22) PCT Filed: Oct. 24, 2006

(86) PCT No.: PCT/EP2006/067719
§ 371 (c)(1),
(2), (4) Date: Apr. 24, 2008

(87) PCT Pub. No.: WO2007/048792
PCT Pub. Date: May 3, 2007

(65) Prior Publication Data
US 2008/0287154 A1    Nov. 20, 2008

(30) Foreign Application Priority Data
Oct. 28, 2005   (EP) .................................... 05110135

(51) Int. Cl.
*H04Q 7/20*    (2006.01)

(52) U.S. Cl. ........ 455/518; 455/519; 455/517; 455/500; 455/426.1; 455/414.1; 370/310; 370/260; 370/262; 370/261; 370/259

(58) Field of Classification Search .................. 455/518, 455/519, 517, 500, 426.1, 426.2, 466, 445, 455/414.1–414.4, 422.1, 403; 370/310, 328, 370/329, 338, 343, 260, 262, 261, 259
See application file for complete search history.

(56) References Cited

U.S. PATENT DOCUMENTS

| 7,283,489 B2 * | 10/2007 | Palaez et al. | 370/277 |
| 7,809,390 B2 * | 10/2010 | Shaffer et al. | 455/518 |
| 2007/0021133 A1 * | 1/2007 | Coulas | 455/518 |
| 2007/0054686 A1 * | 3/2007 | Allen et al. | 455/518 |

* cited by examiner

*Primary Examiner* — Keith T Ferguson

(57) ABSTRACT

A method for use in a push to talk type service in which a floor is required before a client terminal may distribute a media item to at least one other terminal participating with the client terminal in a push to talk type session. According to the invention, the floor is managed depending upon information relating to the size of the media item, and may be managed depending upon other criteria as well. Managing the floor may include one or more of granting the floor, maintaining the floor, monitoring the floor, and releasing the floor. The floor may be denied, for example, if the media item is larger than a predetermined size, which size may be indicated as being within a range of sizes. The push to talk type service may be a general conferencing service.

20 Claims, 2 Drawing Sheets

METHODS AND APPARATUS FOR PUSH TO TALK TYPE SERVICE

BACKGROUND OF THE INVENTION

1. Field of the Invention

The present invention relates to methods and apparatus for use in a push to talk type service, for example a so-called push to talk over cellular service.

2. Description of the Related Art

Walkie-talkie type services have long proved popular amongst users who wish to communicate brief messages quickly between one another. Conventionally, such services have been provided by two-way portable radios which utilise a dedicated part of the radio spectrum, but which only allow users to communicate with a small group of pre-selected users who utilise similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of walkie-talkie type services, an industry grouping known as the Open Mobile Alliance (www.openmobilealliance.org) has been established with the aim of standardising suitable protocols which will allow inter-network operability for Walkie-Talkie services offered over cellular networks. The service established by the various standards is known as Push to talk Over cellular (PoC). PoC proposes that associated speech data will be transported over a packet switched access network. In the case of GSM and UMTS, this will be the general packet radio service (GPRS) or 3G access network. In other network architectures, analogous packet switched access networks will be utilised for transporting talk data. Push to Talk services may also be offered over circuit switched access networks, although this is not the preferred option.

The Push to talk over Cellular (PoC) system is typically implemented on GSM/GPRS/3G networks and which makes use of the IP Multimedia Subsystem (IMS) standardised by the 3$^{rd}$ Generation Partnership Project to facilitate the introduction of advanced data services into cellular networks, and in particular of real-time multimedia services. The IMS relies upon the Session Initiation Protocol (SIP) which has been defined by the Internet Engineering Task Force (IETF) for the setting up and control of multimedia IP-based sessions. A PoC Server is located within the IMS or is attached thereto, and implements the functionality for setting up and controlling PoC Sessions.

Existing push-to-talk (PTT) and conferencing systems typically use a control mechanism to grant one of the users the right to speak while other users in the communication are denied such right and are in listening mode. Such control mechanism is typically referred to as floor control, talker arbitration, talk burst control, etc. For example, the Open Mobile Alliance is currently working on a specification of Push-To-Talk over Cellular (PoC) system, which includes Talk Burst Control Protocol (TBCP).

To request the right to speak on behalf of the user, the terminal (PoC Client) typically sends a request message to the controller (PoC Server). The controller typically responds either granting or rejecting the request. The controller typically restricts the time the user is allowed to talk, typically by starting an allowed talk timer when it grants the request, and uses some mechanism to interrupt the user, typically by sending a revoke message to the user's terminal or by simply not forwarding the user's media. The user who is interrupted by the controller is typically penalized by the controller in some way, e.g. by not granting the user the right to speak for a certain period of time.

The next version of OMA PoC (herein called "PoC 2", with the previous version being called "PoC 1") is evolving in OMA. Part of the new functionality in PoC 2 is to include new media types, allowing the sending of pictures, video etc in the PoC Sessions. The following extract is from the OMA PoC 2 Requirement Document [OMA-RD-PoC-V2_0-20050902-D Push to Talk Over Cellular 2 Requirements, Draft Version 2.0-02. September 2005]: "PoC 2 service facilitates communication among PoC Users using media types, in addition to voice. The additional media types supported could be still images, live-streamed video, file transfer and text, but not limited to the above mentioned list. Video media stream in PoC 2 context implies only the visual component without any reference to audio. A PoC 2 Server provides support for more than one media type in a PoC Session. PoC 2 Clients can support more than one media type in a Session, based on the capabilities of the User Equipment." Also from the OMA PoC 2 Requirement Document: "The PoC Client MAY send images or series of images that are available in the User Equipment (e.g. from a camera) to the Participants of the PoC Session."; "The PoC Server SHALL support the transfer of images or series of images sent by the PoC Client."; "The PoC Client MAY be able to send files that are available in the User Equipment (e.g. a MS word document, a game software package) to the Participants of the PoC Session."; and "The PoC Server SHALL support the transfer of files that are available in the User Equipment (e.g. a MS word document, a game software package)."

As mentioned above, the media sent in a PoC Session is managed by a floor control mechanism. Only the user that currently has the floor is able to send media. In PoC 1, the only media sent is speech; the floor is allocated to a user for a certain time, and during that time the user can talk and the other will receives the talk bursts.

A problem arises if the same mechanism is used for new media types such as pictures in PoC 2. If a user requests the floor for sending a picture of any reasonable size, it is likely that the time the user will have the floor will be insufficient for transferring the picture, and as result only a part of the picture will be received by the session participants. The same will be true for all framed media such as files, video clips etc.

It is desirable to address this problem.

SUMMARY OF THE INVENTION

According to a first aspect of the present invention there is provided a method for use in a push to talk type service in which a floor required for a client terminal to distribute a media item to at least one other terminal participating with the client terminal in a push to talk type session is managed in dependence upon information relating to the size of that media item.

The floor may be managed in dependence upon information relating to the type of the media item.

The floor may be managed in dependence upon information relating an expected transfer rate for the media item.

The media item may be assigned a priority, and the floor may be managed in dependence upon information relating to the priority.

Managing the floor may comprise at least one of granting, maintaining, monitoring and releasing the floor.

The method may comprise, in response to a message from the client terminal requesting the floor, granting or denying the floor to the client terminal in dependence upon the information.

The method may comprise denying the floor if the media item is larger than a predetermined size.

The method may comprise specifying, if the floor is granted, a minimum transfer rate for transferring the media item, and revoking the floor if this transfer rate is not achieved over a predetermined period of time while the floor is open.

The method may comprise sending the information from the client terminal in a message requesting the floor.

The method may comprise sending at least some of the information to at least one other terminal participating in the session.

The method may comprise using the information at a receiving terminal to indicate the progress of retrieving the media item during the session.

The method may comprise using the information at a receiving terminal to allocate memory for storing the media item.

The at least some of the information may comprise information relating to the size of the media item.

The push to talk type service may be a push to talk over cellular service.

The push to talk type service may be a conferencing service.

The media item may be a framed media item.

The media item may have a predetermined size, or at least within a predetermined range of sizes, and the information may relate to that size or range of sizes. According to a second aspect of the present invention there is provided a server for use in a push to talk type service, comprising means for managing a floor, required for a client terminal to distribute a media item to at least one other terminal participating with the client terminal in a push to talk type session, in dependence upon information relating to the size of that media item.

According to a third aspect of the present invention there is provided a method for use in a push to talk type service in which a floor is required to distribute a media item to at least one other terminal participating in a push to talk type session, comprising sending information relating to the size of that media item to a server designated to control the session, the information being for use by the server to manage the floor.

According to a fourth aspect of the present invention there is provided a client terminal for use in a push to talk type service in which a floor is required to distribute a media item to at least one other terminal participating in a push to talk type session, comprising means for sending information relating to the size of that media item to a server designated to control the session, the information being for use by the server to manage the floor.

According to a fifth aspect of the present invention there is provided an operating program which, when loaded into an apparatus, causes the apparatus to become an apparatus according to the second or fourth aspect of the present invention.

According to a sixth aspect of the present invention there is provided an operating program which, when run on an apparatus, causes the apparatus to carry out a method according to the first or third aspect of the present invention.

The operating program may be carried on a carrier medium. The carrier medium may be a transmission medium. The carrier medium may be a storage medium.

An embodiment of the present invention provides a floor control mechanism for the new framed media types of PoC 2 based on the size of the media. It will also make it possible for the PoC Server to cancel the sending of the media if it proving to be too slow (for example, "I have only received 1 k of a 5 Gb file and it has taken 10 minutes—please consider cancelling the sending of more data"). Also, since the PoC Server can convey size information to the recipients, the recipients are able to allocate appropriate amounts of memory, let the user decide if he wants the media, and provide an indication to the user of the progress of the transfer.

An embodiment of the present invention provides a floor control mechanism based on size of the distributed media. An embodiment of the present invention provides a way for the sending client to request the floor based on the content that will be sent over via the floor control. An embodiment of the present invention provides a way for the server handling floor control functionality to grant or deny a floor request based on size of the sending content. An embodiment of the present invention provides a way for a server handling floor control to control the upload form a client based on the information of size of the content and elapsed time for how the long upload has progressed and there by determine if the transfer rate is sufficient both of usability and service provider policy point of view. An embodiment of the present invention provides a way for a server handling floor control to inform other entities involved in a communication session involving distribution of framed content about the expected size of the content in order to prepare for the content by for example allocate memory in piece of software. An embodiment of the present invention provides a way for a server handling floor control to inform other entities involved in a communication session about the progress of the distribution in order to enable a more user-friendly service.

DETAILED DESCRIPTION OF THE PREFERRED EMBODIMENTS

In one method embodying the present invention, the floor required for a client terminal to distribute a media item to other terminals participating with the client terminal in a PoC Session is set up and controlled in dependence upon information relating to the size of that media item. This effectively provides a size-adaptive floor control mechanism for use in a PoC service. The user requesting the floor can include the size of the media item that it wishes to distribute in the PoC Session in the floor request. The PoC Server can then either grant or deny access to the floor based on this information. If granted, the user can have the floor until the media data, up to the size requested, has been distributed.

Figure 1:
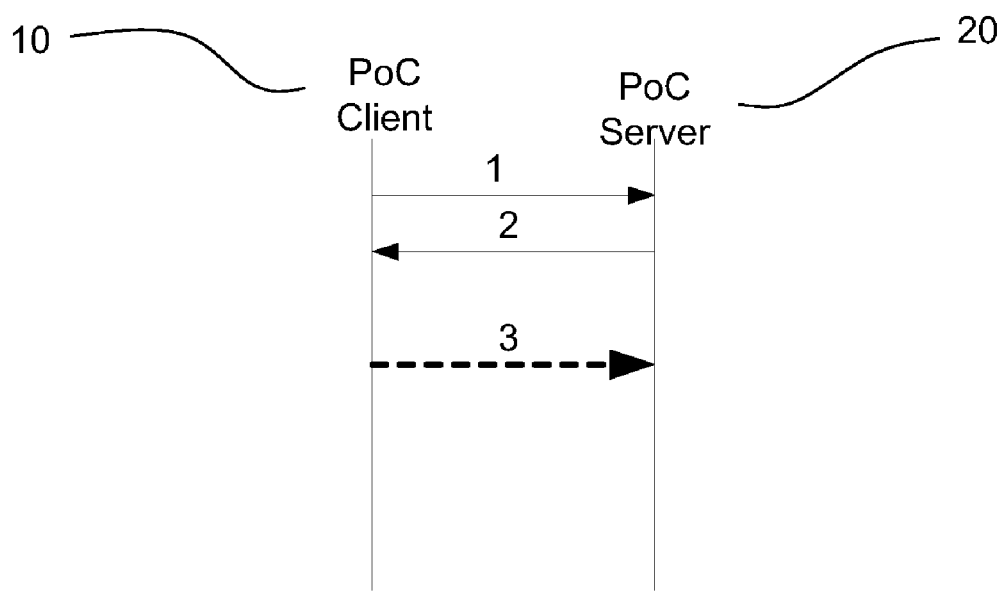
FIG. 1 is a message exchange diagram illustrating schematically a method and apparatus embodying the present invention.
Figure 2:
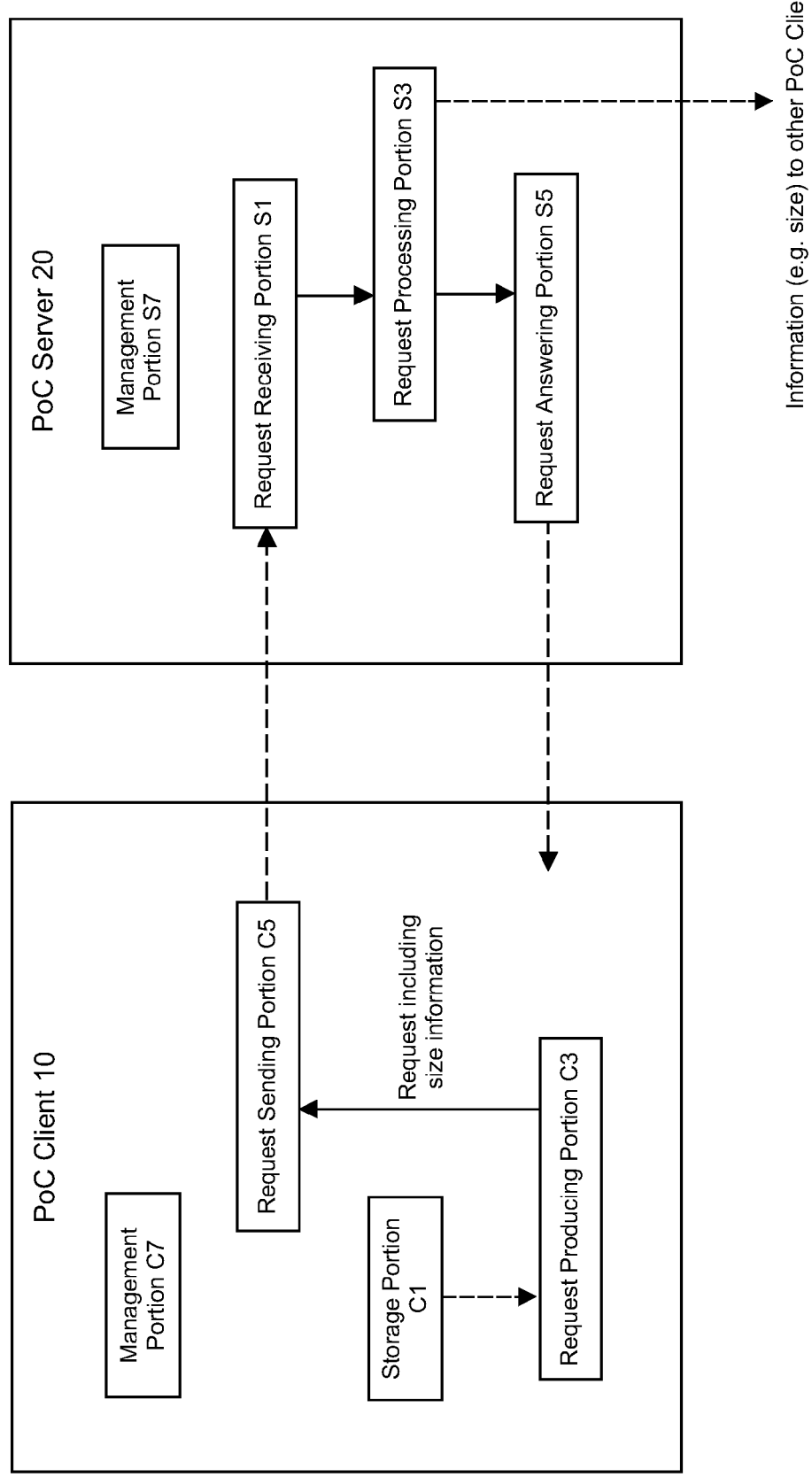
FIG. 2 is a block diagram schematically illustrating parts of a PoC Client and a PoC Server in an embodiment of the present invention.

A method and apparatus embodying the present invention is shown in FIG. 1. Shown in FIG. 1 is a PoC Client 10 in communication with a PoC Server 20. FIG. 2 is a block diagram schematically illustrating parts of the PoC Client 10 and the PoC Server 20. PoC Client 10 comprises a storage portion C1, a request producing portion C3, and a request sending portion C5; these parts operate under overall control of a management portion C7. PoC Server 20 comprises a request receiving portion S1, a request processing portion S3, and a request answering portion S5; these parts operate under overall control of a management portion S7.

In step 1, a media item that the PoC Client 10 wishes to be distributed to other clients participating in the PoC Session (the media item being stored in the Storage Portion C1) is made available to the Request Producing Portion C3. The Request Producing Portion C3 determines the size of the media item, and produces a Talk Burst Request including the size of the media item. The Talk Burst Request is then sent from the Request Sending Portion C5 of the PoC Client 10 to the PoC Server 20. The Talk Burst Request is used by the PoC Client 10 to request permission from the PoC Server 20 to send the media item.

The Talk Burst Request is received at the Request Receiving Portion S1 of the PoC Server 20 and passed to the Request Processing Portion S3. The Request Processing Portion S3 examines the media size information contained in the Talk Burst Request to determine whether or not to grant the floor to the PoC Server 10 in a subsequent Talk Burst. If the media item is smaller than a predetermined size, the PoC Server 20 decides to grant the Talk Burst, and a message is sent from the Request Answering Portion S5 of the PoC Server 20 to the PoC Client 10 in step 2 to notify the PoC Client 10 that it has been granted permission to send the media item of the requested size. On the other hand, if the media item is larger than the predetermined size, the PoC Server 20 decides to deny the Talk Burst, and the message in step 2 can be used to notify the PoC Client 10 that it has been denied permission to send the media item of the requested size.

If the Talk Request has been granted, in step 3 transfer of the media item to the PoC Server 20 is performed over the granted floor. The PoC Server 20 will then distribute the media item to the other session participants (not shown).

When the PoC Client 10 requests the floor to transfer the media item, it may also use the Request Producing Portion C3 to include other parameters that could help the Request Processing Portion S3 of the PoC Server 20 to make a decision whether or not to grant the floor for the transfer. Other parameters may include the expected transfer rate, a priority associated with the media item, a maximum time the client can dedicate to the Talk Burst, and information about the media content, format, type and so on. The main criteria used by the PoC Server 20 to decide would, in this embodiment, be the size of the framed content. However, various types of information can be used in combination with the size information to make the determination. For example, the floor may be denied outright any media item larger than a first predetermined size, denied for any video items larger than a second predetermined size smaller than the first predetermined size, denied for any picture items larger than a third predetermined size smaller than the second predetermined size unless of a high priority, and granted otherwise. Other types of rule would be readily possible.

When granting the floor to the PoC Client 10 in step 2, the Request Processing Portion S3 of the PoC Server 20 may also include parameters such as a minimum transfer rate (the PoC Client 10 would need to send the content with a higher rate than this or the floor will be revoked), and a maximum time (after which the floor will be revoked).

The Request Processing Portion S3 of the PoC Server 20 may also, based on the information it has received from the PoC Client 10 as well as other sources such as underlying network, propagate this information to the other participants of the PoC Session. This information can be used at the receiving participant for various purposes, such as allocating sufficient memory for the media item, or providing information to the end user about the progress of the retrieval of the media item.

PoC 1 has a revocation procedure in which the PoC Server will inform the PoC Client (which may in turn inform the user of the PoC Client) that the floor is about to expire; a grace timer can be used to indicate to the user how much time remains before he loses the floor. The same time-based mechanism would be of limited value for the client when sending framed content, as in an embodiment of the present invention. For a size-based floor control mechanism embodying the present invention, the transfer rate is of more importance and a revoke procedure could be performed when the PoC Server 20 notices that the transfer rate is too low, either compared to either what has been negotiated or according to service provider policy.

In this description, a "framed" media item is to be understood as a media item that has an identifiable beginning and end. For example, a picture, movie, speech file or any other type of data file would be a "framed" media item. This would usually be where the content is known in advance, although it would be possible to modify the content of the media item (e.g. at the PoC Server or equivalent) after the sending terminal has requested and been granted the floor, if it is known in advance what sort of modifications will be applied and how they would affect the size of the media item. For example, the PoC Server might alter the size of a media item passing through e.g. by adding a corporate logo or confidentiality notice to any pictures or video. However, a request for the floor to transmit a stream of speech data, where it is not known in advance what will be said and hence how much data will be required to encode the speech, would not be considered to be a request to transfer a "framed" media item. On the other hand, it would be possible to request the floor to transmit speech data up to a certain size limit, without knowing in advance the content of the speech, such that the user who is granted the floor would be able to speak until that limit is reached, irrespective of the time taken or whether he or she has finished speaking. Therefore an embodiment of the present invention may be considered to cover not only the case where a media "item" is a preformed and framed media file having a predetermined content, but also media content in general having a specified or predictable size or amount of data but an unspecified content (at the time of requesting the floor to transfer the media content).

Although an embodiment of the present invention is described above in relation to PoC, it will be appreciated that the invention is not limited to PoC. Any other type of service distributing framed media in a communication session will benefit from a size-based floor control in order to control the uploading rate of the sender as well avoiding a situation where everyone is sending at the same time and thereby overloading the air interface or other narrow resource. The term "push to talk" service is used here to identify services of a walkie-talkie nature. These are services that allow two or more users to be connected together quickly for the exchange of talk bursts. Push to Talk services differ from conventional voice calls in that these services allow only one person to talk at a given time. In order to talk, users must have control of the "floor". Control is typically achieved by one user releasing a talk button to release floor control, and another user pressing a talk button to assume floor control. It is to be understood that the term "push to talk" used in the appended claims is not intended to imply the use of any particular protocol. It is also possible that two Clients manage a PoC Session between themselves, using a method embodying the present invention, without the involvement of a PoC Server.

It is also to be understood that the scope of the present invention is not limited to the transfer of talk or speech data in a talk session, and the appended claims are to be read as covering the transfer of any type of data in a data transfer session, including but not limited to speech data. As such, terminology such as "Talk Burst Request" and "Talk Burst" is not to be interpreted as being limited to talk, i.e. speech, data only, but is used for consistency with PoC 1 terminology; such phrases can include within their meaning the transfer of any type of data. In PoC 2, different terminology may be used for concepts that correspond directly with those in PoC 1; for example the phrases "Media Burst Request" and "Media Burst" may be used instead.

It is also to be understood that the scope of the present invention is intended to include conferencing systems in which a participant is granted floor control and hence the right to speak or transfer data to other participants in the conference.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

What is claimed is:

1. A method for use in a push to talk type service in which a floor is required for a client terminal to distribute a media item to at least one other terminal participating with the client terminal in a push to talk type session, said method comprising the steps of:
   receiving by a control server, a request for the floor from the client terminal requesting to distribute the media item;
   determining the size of the media item; and
   managing the floor by the control server in dependence upon information relating to the size of the media item, the managing step including:
      granting the floor by the control server when the media item is smaller than a predetermined size; and
      denying the floor by the control server when the media item is larger than the predetermined size.

2. The method according to claim 1, wherein the floor is further managed in dependence upon information relating to the type of the media item.

3. The method according to claim 1, further comprising determining an expected transfer rate; wherein the floor is further managed in dependence upon information relating the expected transfer rate for the media item.

4. The method according to claim 1, wherein the media item is associated with a priority, and wherein the floor is further managed in dependence upon information relating to the priority.

5. The method according to claim 1, wherein managing the floor comprises at least one of granting, maintaining, monitoring and releasing the floor.

6. The method according to claim 1, wherein the step of managing the floor includes granting or denying the floor to the client terminal in dependence upon at least one other factor in addition to the size of the media.

7. The method according to claim 1, further comprising specifying, if the floor is granted, a minimum transfer rate for transferring the media item, and revoking the floor if this transfer rate is not achieved over a predetermined period of time while the floor is open.

8. The method according to claim 1, wherein the client terminal sends the information relating to the size of the media item in the request for the floor.

9. The method according to claim 1, further comprising sending the information relating to the size of the media item to at least one receiving terminal participating in the session.

10. The method according to claim 9, further comprising using the information at a receiving terminal to determine the progress of distributing the media item during the session.

11. The method according to claim 9, further comprising using the information at a receiving terminal to allocate memory for storing the media item.

12. The method according to claim 9, wherein the information further comprises information in addition to information relating to the size of the media item.

13. The method according to claim 1, wherein the push to talk type service is a push to talk over cellular service.

14. The method according to claim 1, wherein the push to talk type service is a conferencing service.

15. The method according to claim 1, wherein the media item is a framed media item.

16. The method according to claim 1, wherein the size of the media item is determined to be within a range of sizes, and the information relating to the size of the media item relates to the range of sizes.

17. A server for use in a push to talk type service in which a floor is required for a client terminal to distribute a media item to at least one other terminal participating with the client terminal in a push to talk type session, the server comprising:
   means for receiving a request for the floor from the client terminal requesting to distribute the media item;
   means for determining the size of the media item;
   means for managing the floor in dependence upon information relating to the size of the media item, wherein the means for managing the floor grants the floor when the media item is smaller than a predetermined size, and denies the floor when the media item is larger than the predetermined size.

18. A method for use in a push to talk type service in which a floor is required to distribute a media item to at least one receiving terminal participating in a push to talk type session, the method comprising the steps of:
   sending information relating to the size of the media item from a client terminal requestinq the floor to a server designated to control the session, wherein the server only allows media items smaller than a predetermined size to be distributed; and
   distributing the media item to the receiving terminal when allowed by the server.

19. A client terminal for use in a push to talk type service in which a floor is required to distribute a media item to at least one other terminal participating in a push to talk type session, the client terminal comprising:
   means for sending information relating to the size of the media item to a server designated to control the session, wherein the server only allows media items smaller than a predetermined size to be distributed; and
   means for distributing the media item to the receiving terminal when allowed by the server.

20. An operating program stored on a non-transitory medium that, when executed by a server controlling communications between a sending terminal and a receiving terminal, causes the server to:
   receive a request from the sending terminal requesting to send a media item to the receiving terminal;
   determine the size of the media item; and
   allow the media item to be sent only when the media item is smaller than a predetermined size.

* * * * *

UNITED STATES PATENT AND TRADEMARK OFFICE
CERTIFICATE OF CORRECTION

| | | |
|---|---|---|
| PATENT NO. | : 7,991,417 B2 | Page 1 of 1 |
| APPLICATION NO. | : 12/091366 | |
| DATED | : August 2, 2011 | |
| INVENTOR(S) | : Albertsson et al. | |

It is certified that error appears in the above-identified patent and that said Letters Patent is hereby corrected as shown below:

In Column 8, Line 41, in Claim 18, delete "requestinq" and insert -- requesting --, therefor.

Signed and Sealed this
Third Day of January, 2012

David J. Kappos
*Director of the United States Patent and Trademark Office*